United States Patent
Westphal et al.

[15] 3,695,777
[45] Oct. 3, 1972

[54] SUPPORTING DEVICE FOR PIVOTAL GUIDE BLADES IN THERMAL TURBO-MACHINES

[72] Inventors: Bernd Westphal, Wellsville, N.Y. 14895; George Kandler, Munich, Germany

[73] Assignee: Motoren-Und Turbinen-Union GmbH Munich, Germany

[22] Filed: May 20, 1970

[21] Appl. No.: 39,088

[30] Foreign Application Priority Data

May 23, 1969 Germany..........P 19 26 338.8

[52] U.S. Cl. ................415/216, 415/147, 415/160
[51] Int. Cl. ........F01d 1/02, F01b 25/02, F01b 17/12
[58] Field of Search......415/148, 149, 147, 160, 161, 415/162, 163, 164, 165, 216, 217, 115

[56] References Cited

UNITED STATES PATENTS 3,089,679   5/1963   Henny.....................415/160
3,525,574   8/1970   Zerlauth...................415/115

*Primary Examiner*—Henry F. Raduazo
*Attorney*—Craig, Antonelli & Hill

[57] ABSTRACT

A device for supporting and sealing pivotal guide blades of turbo-machines, particularly of small gas turbines, in which the blade shaft serving as adjusting shaft for the guide blade is supported in a bearing bush which is fitted within the bearing support of a housing; the blade shaft, the bearing bush and the bearing support are thereby so dimensioned and selected from such materials as regards their coefficients of expansion that the necessary clearance for proper operation will exist at every operating temperature in at least one of the resulting fits.

29 Claims, 5 Drawing Figures

PATENTED OCT 3 1972   3,695,777

SUPPORTING DEVICE FOR PIVOTAL GUIDE BLADES IN THERMAL TURBO-MACHINES

This invention relates to a device for supporting and sealing pivotal guide blades in thermal turbo machines, particularly in small gas turbines, in which a blade shaft constructed as adjusting or acutaing shaft is supported in a bearing bush of a bearing support.

In the design of bearing assemblies and sealing systems for adjustable guide blades in thermal turbo machines, special problems arise resulting from the requirement for satisfactory blade operation over a large temperature range. It is not possible to specify the identical material or at least, the same thermal expansion coefficient for all components of the bearing assembly, since the required anti-friction properties for the material combination of the bearing calls for bush material which generally has a considerably lower thermal coefficient of expansion than the bearing support and the blade shaft. Consequently, the bearing clearances selected for the cold condition vary over the temperature range. For the above reason, a very large bearing clearance had to be selected in the known arrangements to avoid binding due to thermal expansion under extreme temperature conditions. When, in the past, it was attempted to reduce the high leakage losses and the danger of burning the support connected therewith in the presence of hot gases as a result of the large bearing clearance, separate complicated and expensive devices for sealing the guide blade space against the surrounding area had to be provided or a high degree of bearing cooling was necessary to avoid large differences in bearing clearance.

Guide blade bearing supports are known in the prior art in which the guide blade space or duct is sealed against the outside by supplying special sealing air which simultaneously provides cooling for minimum thermal expansion and minimum variation in bearing clearance over the entire operating temperature range. Such arrangements, however, entail the disadvantage of high losses necessitated by the required sealing air.

The objective of this invention is to provide a bearing assembly with a material combination ensuring low friction, and in addition satisfactory operation and sealing of the bearing area over a wide temperature range, without having to use pressurized and/or cooling air.

The basic concept as solution to the underlying problems essentially consists of matching the specific thermal expansion of blade shaft, bush and bearing support by designing and dimensioning the same in such a manner that at every temperature level the bearing clearance necessary for free rotational movement exists in at least one of the occurring fits, i.e., on not less than two mating parts.

In a first embodiment of this general concept, the bearing bush is constructed as a straight cylindrical bush provided with a collar seated against the inner side of the bearing support, the fits between the blade shaft and the bearing bush and between the bearing bush and the bearing support being so selected that due to the different thermal expansion of these three components, the desired bearing clearance exists between the blade shaft and the bearing bush at a low temperature level and between the bearing bush and the bearing support at high temperature levels.

The materials of blade shaft and bearing support should have roughly the same thermal expansion coefficient $\alpha_1$ while the coefficient $\alpha_B$ of the bearing bush should be approximately one third only of $\alpha_1$. The fits are so selected that under minimum temperature a shrink fit exists between the bearing bush and the bearing support with the resulting stresses in both components just being below the respective yield points; in this case, the bearing clearance exists between the blade shaft and the bearing bush. With increasing operating temperature the shaft will expand by a greater amount than the bearing bush resulting in a decrease of the bearing clearance, while the shrink fit between the bearing bush and the bearing support begins to be loosened due to the greater expansion of the bearing support. When a temperature limit is exceeded, the blade shaft is fixed in the bearing bush, i.e., a shrink fit exists between the blade shaft and the bearing bush, while the latter has a clearance fit in the bearing support.

Thus, the main advantage of this first embodiment of the present invention essentially resides in that the total clearance conditioned by a wide temperature range is actually subdivided or shared between two fits, i.e., on the one hand by the blade shaft/bearing bush fit and on the other, by the bearing bush/bearing support fit so that, under most adverse conditions, i.e., under minimum or maximum temperature, half the total bearing clearance can exist in one fit.

Another advantage of this arrangement is that in the low temperature range, the clearance fit occurs at the component having maximum temperature, i.e., at the blade shaft, while under high temperature conditions, the clearance exists at the location of minimum temperature, i.e., between the bush and the bearing support. The variations in anti-friction properties of the bush material which are dependent upon the temperature are thereby kept to a minimum.

According to one embodiment of this invention, ceramic material or suitable carbon material is used for the bearing bush, which possess very favorable anti-friction properties over a wide temperature range.

According to another feature of the present invention the blade shaft is provided with an annular collar at its blade end abutting against the collar of the bearing bush on the casing inner side. Due to the excess pressure in the guide blade space, a force is exerted upon this collar in the outward direction pressing the annular collar against the collar of the bearing bush so that a sealing effect is realized.

According to still another feature and development of this invention, a spring is provided, prestressed in the direction of the blade shaft axis, which, on the one hand, is seated against the outer side of the casing either indirectly by way of intermediate members such as shims or directly, and, on the other, is seated, against the blade shaft so that the annular collar of the blade shaft is pressed against the collar of the bearing bush by the spring force. This arrangement offers advantages when, with a slight excess pressure in the guide blade space, the pressure force acting upon the blade shaft sealing collar is not sufficient to produce a sufficiently satisfactory sealing.

According to a further feature of this invention the blade shaft is constructed as a hollow shaft, whence a small heat flow from the blade through the blade shaft is achieved.

Although an object of this invention is to provide an arrangement which does not necessarily require any sealing or cooling air, the possibility of the use of sealing or cooling air as an additional auxiliary means in cases where very large temperature ranges and particularly so-called temperature shocks have to be mastered, is not to be excluded. For this reason, according to one embodiment of this invention two bearing bushes are inserted into the bore of the bearing support instead of the single, unitary bearing bush, with the two bushes so dimensioned that in the center portion of the bore an annular space remains, extending between the two bushes in an axial direction, to which is connected a line conducting compressed air. This arrangement allows a certain degree of cooling of the bearing area, so that, even in case of extreme temperature loads, the occurring clearances do not become excessively large or excessively small, respectively.

In another embodiment of the general concept of the present invention, an additional, intermediate bush is provided between the bearing bush and the bearing support, whose coefficient of thermal expansion is smaller than that of the bearing support but greater than that of the bearing bush. Thus, the thermal expansion coefficients decrease in steps from the bearing support by way of the intermediate bush to the bearing bush, while the coefficient of expansion of the blade shaft metal is of the same magnitude as the coefficient of expansion of the bearing support metal. In the case of this arrangement, the clearance fit exists between the blade shaft and the bearing bush over the entire temperature range.

This arrangement offers the following two advantages:

One fit only has to be manufactured with high surface quality, i.e., only the blade shaft and the inner surface of the bearing bush must be finish-machined. With this arrangement, the maximum bearing clearance exists at minimum operating temperature. With increasing temperature the clearance decreases, due to the greater expansion of the blade shaft relative to the bearing bush. The intermediate bush is again shrunk into the bearing support with high initial stress and the bearing bush is again shrunk into the intermediate bush with high initial stress, i.e., the intermediate bush forms a large interference shrink fit with the bearing support and the bearing bush again a large interference shrink fit with the intermediate bush, so that, with rising temperature these stresses are initially reduced due to the interference, however, due to the division of the heat expansion over two different fits, a loosening of the bushes is avoided.

In another embodiment of the general concept of the present invention two bearing bushes are fitted from both sides into the bearing support, which have conical sealing faces whereby a collar is provided on each end of the blade shaft with corresponding conical faces seated against the conical sealing faces of the bushes so that two cone locating seats are formed.

This arrangement has the advantage that the clearance fit between the bearing bushes and the bearing support may be constructed with a large or coarse tolerance, since the rotation of the blade shaft takes place at the conical sealing faces between the bearing bushes and the blade collars. With this arrangement, one achieves practically a clearance-free bearing support of the guide blades since the conical faces ensure positive, unequivocal location both of the guide blades in the axial and radial directions and good sealing of the guide blade space can be ensured by the selection of the prestressed spring which is inserted between the blade shaft and the bearing support as described above. The bearing bushes are in contact with the blade shaft with only their conical faces and not with their cylindrical inner surfaces, so that a thermal expansion of the blade shaft with the conical collars has no effect on the bearing clearance. In this embodiment, the bearing bushes are sealed at their collars against the casing or housing.

Another embodiment of the present invention is characterized in that between the conical collars of the blade shaft and the conical faces of a bearing bush or the bearing bushes, one intermediate ring each, such as a shim is provided having the form of a truncated cone with its surfaces parallel to the sealing faces.

This embodiment offers manufacturing advantages since only the intermediate rings or shims have to be made from a material having good anti-friction properties.

These and other objects, features and advantages of the present invention will become more obvious from the following description when taken in connection with the accompanying drawing which shows, for purposes of illustration only, several embodiments in accordance with the present invention, and wherein.

Figure 1:
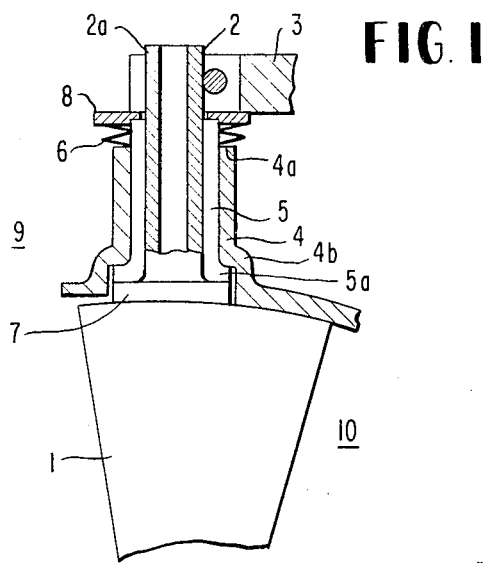
FIG. 1 is a somewhat schematic partial cross-sectional view of one embodiment of a guide blade bearing support according to the present invention with a cylindrical bearing bush directly fitted into the bearing support.

Referring now to the drawing wherein like reference numerals are used throughout the various views to designate like parts, and more particularly to FIG. 1, this figure illustrates a bearing support (housing) 4, into which is inserted or fitted a straight cylindrical bearing bush 5 that is provided with a collar 5a on the casing inner side. A guide blade 1 is supported in this bearing bush 5 by means of its hollow shaft 2. The housing 4 is made, for example, from a cobalt alloy (HS 25) which includes chromium, tungsten, and nickel, and which has a coefficient of thermal expansion $\alpha_1 = 16 \cdot 10^{-6}$ 1/deg.C.

The bearing bush 5 consists of ceramic material with an expansion coefficient $\alpha_B = 5 \cdot 10^{-6}$ 1/deg.C. An actuating or adjusting lever 3 is clamped to the top end 2a of the blade shaft 2. A cup spring 6 is provided between the outer end face 4a of the housing 4 and the actuating lever 3, which is preloaded or prestressed in the axial direction. The spring force of this cup spring 6 presses the blade shaft 2 outwards, so that an annular collar 7 provided on the blade end of the blade shaft 2 is seated against the end face of collar 5a resulting in an effective sealing of the guide blade space 10 against surroundings 9. A support washer 8 is provided between the actuating lever 3 and the cup spring 6.

The fits of blade shaft/bearing bush and bearing bush/housing are so selected that at minimum temperature, the bush 5 is shrunk into the housing 4 with a shrink fit lying just below the yield point and the bearing clearance exists between shaft 2 and bush 5, while, at high operating temperature, the shaft 2 is stuck in the bearing bush 5, i.e., forms an interference fit in bearing bush 5 and is free to rotate together with the latter in the housing 4. Also in the high temperature range, an effective sealing against the surroundings is achieved by the abutment of collar 5a abutting against the shoulder 4b in the housing.

Figure 2:
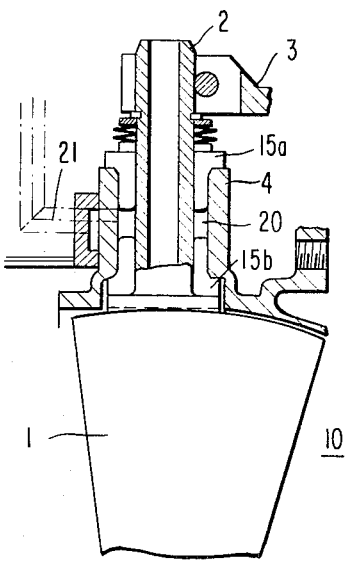
FIG. 2 is a somewhat schematic partial cross-sectional view of a modified embodiment according to FIG. 1 with a two-partite or divided bearing bush and with additional air cooling in accordance with the present invention.

The arrangement shown in FIG. 2 is substantially similar to the bearing assembly illustrated in FIG. 1, only the bush 5 is replaced by two bearing bushes 15a and 15b fitted into the bearing bore of the housing 4 from both ends. An annular space 20 remains in the center portion of the housing bore between the two bushes 15a and 15b, which is connected to a compressed air line 21 shown schematically only. The materials and coefficients of expansion correspond to those used in FIG. 1.

Figure 3:
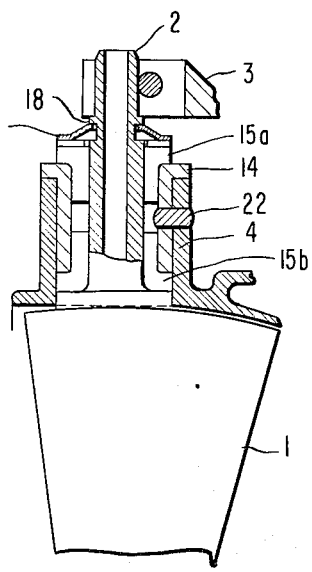
FIG. 3 is a somewhat schematic, partial cross-sectional view of a bearing assembly with two-partite or divided bearing bushes and an additional intermediate bush fitted into the bearing support in accordance with the present invention.

The arrangement shown in FIG. 3 with an intermediate bush 14 fitted into the bearing support 4 and with two bearing bushes 15a, 15b corresponds to FIG. 1 or 2 as far as the used components are concerned. Also in this case, the guide blade is designated by reference numeral 1, the hollow blade shaft by reference numeral 2, the actuating lever by reference numeral 3 and the internal bearing bushes by reference numerals 15a and 15b. In this arrangement, the axially preloaded cup spring 6 is seated in a groove 18 of the blade shaft 2, on the one hand, and against the bearing bush 15a, on the other, so that the same effect is achieved as with spring 6 in FIG. 1. The material for the intermediate bush 14 is so selected that its thermal coefficient of expansion lies between the coefficient of expansion of the bearing bushes 15a, 15b and that of the bearing support 4. With this arrangement, the bearing clearance between the blade shaft 2 and the bearing bushes 15a and 15b is maintained over the entire temperature range. Bush 14 is shrunk into housing 4 in cold condition, i.e., is a cold shrink fit in the housing 4. The bearing bushes 15a and 15b, are shrink fitted into the bush 14. In view of the fact that the shrink fits or interference fits are decreased at high temperature as a result of the different thermal expansions, a securing pin 22 is provided which positively prevents rotation of the bush 14 relative to the housing 4.

In the arrangement shown in FIG. 4 the guide blade is again designated by reference numeral 1, the blade shaft by reference numeral 2, the actuating lever by reference numeral 3, the housing by reference numeral 4 and the bearing bushes, which are movable in the housing, are designated by reference numerals 15a and 15b. The blade shaft 2 is constructed as conical collar 37 at its blade end and carries another conical collar 38 at the actuating lever end. The bearing bushes 15a and 15b are provided with internal conical faces corresponding to the conical faces of the parts 37 and 38 so that one conical seat each is formed at the contact surfaces between parts 37 and 15b and between parts 38 and 15a. These two conical seats serve at the same time as the support of the guide blade both in the axial and radial directions and as the seal for guide blade space 10 against the surrounding zone 9. A cup spring 6 is again provided between bush 15a and the outer end face of the bearing bore of housing 4, forcing the conical faces of the bushes 15a and 15b against the corresponding surfaces of the parts 37, 38.

An adjusting washer 39 is disposed between bearing bush 15b and shoulder 4b on the housing by means of which the clearance between the top edge 1b of guide blade 1 and the housing inner side is adjusted.

Figure 4:
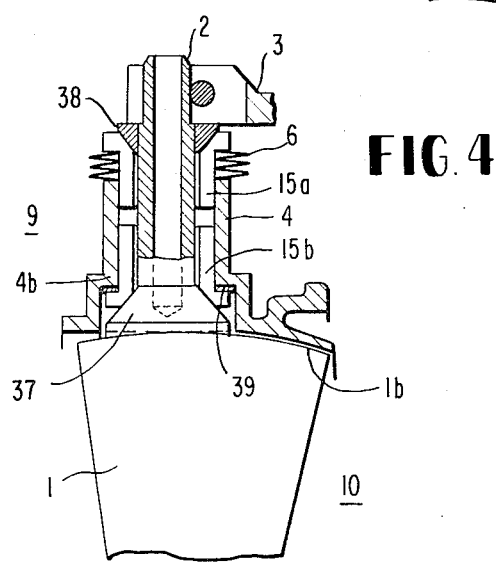
FIG. 4 is a somewhat schematic, partial cross-sectional view of an arrangement with two bearing bushes having conical sealing surfaces in accordance with the present invention.
Figure 5:
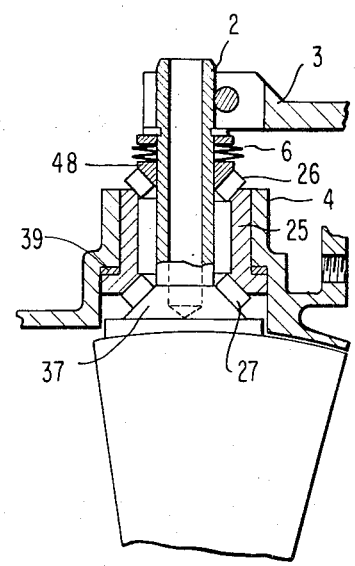
FIG. 5 is a somewhat schematic, partial cross-sectional view of a guide blade arrangement, according to FIG. 4, in which the bearing bushes are replaced by conical intermediate rings.

The arrangement illustrated in FIG. 5 corresponds to that of FIG. 4 as far as the construction is concerned and therefore the description of this embodiment is limited to the features that differ from FIG. 4. Instead of two bearing bushes 15a, 15b, only a single bush 25 is fitted into housing 4, which is provided with an internal cone each on the outer and inner end faces thereof. The bush 25 is shrink fitted into housing 4 and consists of a material with a coefficient of expansion similar to the coefficient of expansion of the material used for the housing 4. On each of the conical surfaces of the bush 25 are seated intermediate rings 26 and 27 having the shape of a truncated cone with surfaces parallel to the internal cone of the bush 25. The blade shaft 2 is again constructed as a conical collar 37 at its blade end, which is seated against the intermediate ring 27. A conical ring 48 adjustable in the axial direction is seated on the blade shaft 2 near the actuating lever end thereof. The ring 48 is seated with its conical surface against the intermediate ring 26. Differences in heat expansion between the blade shaft 2 and the bush 25 or the housing 4, respectively, are taken up in the radial and axial directions by the cup spring 6 which is supported on the conical ring 48 and on the blade shaft 2 so that the arrangement shown in FIG. 5 results in practice in a clearance-free support both in the axial and radial directions.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all those changes and modifications as are encompassed by the scope of the appended claims.

We claim:

1. An installation for supporting a pivotal guide blade in a thermal turbo machine of the type wherein the guide blade experiences varying temperatures during operation of the machine; said installation comprising: a guide blade shaft fixed to said guide blade, bearing support means operatively connected to machine structure adjacent the guide blade, and bearing bush means interposed between said shaft and said support means; the bush means, the shaft, and the support means having respective predetermined dimensions and thermal coefficients of expansion such that internal surface portions of said bush means are slidable with respect to external surface portions of said shaft when the installation experiences a first predetermined temperature range of said thermal machine and such that external surface portions of said bush means are slidable with respect to internal surface portions of said support means when the installation experiences a second predetermined temperature range said thermal machine.

2. An installation according to claim 1, characterized in that the turbo machine is a small gas turbine and in that the blade shaft is constructed as an adjusting shaft adapted to adjust the position of a respective guide blade.

3. An installation according to claim 1, characterized in that the bush means is a straight cylindrical bush having an annular collar seated directly against an inside shoulder of the bearing support, said collar and said shoulder forming a seal for preventing the flow of gases away from the blade area.

4. An installation according to claim 1, characterized in that the bush means essentially consists of ceramic material.

5. An installation according to claim 1, characterized in that the bush means essentially consists of carbon.

6. An installation according to claim 3, characterized in that the blade shaft is provided at its blade end with an annular collar seated against a collar of the bearing bush means.

7. An installation according to claim 6, characterized in that a spring means is provided, said spring means being prestressed in the axial direction of the blade shaft and being seated against the outer side of the bearing support and against the blade shaft so that the annular collar of the blade shaft is pressed against the collar of the bearing bush means by spring force.

8. An installation according to claim 7, characterized in that the spring means is indirectly supported on the outer side of the bearing support by way of intermediate means.

9. An installation according to claim 7, characterized in that the spring means is supported directly at the bearing support.

10. An installation according to claim 7, characterized in that the blade shaft is a hollow shaft.

11. An installation according to claim 10, characterized in that said bush means is a single unitary bushing made in one piece.

12. An installation according to claim 10, characterized in that the bush means includes two bushes fitted in a bore of the bearing support such that an annular space is left in the center portion of the bore extending in the axial direction between the two bushes, and in that a line supplying compressed air leads to said annular space.

13. An installation according to claim 12, characterized in that the bush means includes a third bush inserted between the two bushes and the bearing support, said third bush having a smaller thermal expansion coefficient than the bearing support but a greater thermal expansion coefficient than the two bushes.

14. An installation according to claim 13, characterized in that the bearing bush means have conical sealing surfaces and that one collar each is provided at both ends of the blade shaft having corresponding conical surfaces so that two conical seats are formed.

15. An installation according to claim 14, characterized in that an intermediate ring means is provided between the conical collars of the blade shaft and the conical surfaces of the bearing bush means, the intermediate ring means having the form of a truncated cone with its surfaces substantially parallel to the sealing surfaces.

16. An installation according to claim 15, characterized in that the bush means essentially consists of ceramic material.

17. An installation according to claim 15, characterized in that the bush means essentially consists of carbon.

18. An installation according to claim 26, characterized in that the blade shaft is provided at its blade end with an annular collar seated against a collar of the bearing bush means.

19. An installation according to claim 18, characterized in that a spring means is provided, said spring means being prestressed in the axial direction of the blade shaft and being seated against the outer side of the bearing support and against the blade shaft so that the annular collar of the blade shaft is pressed against the collar of the bearing bush means by spring force.

20. An installation according to claim 19, characterized in that the blade shaft is a hollow shaft.

21. An installation according to claim 19, characterized in that the bush means includes two bushes fitted in a bore of the bearing support such that an annular space is left in the center portion of the bore extending in the axial direction between the two bushes, and in that a line supplying compressed air leads to said annular space.

22. An installation according to claim 1, characterized in that the bearing bush means includes two separate bushes in surrounding relationship to one another, the bush closest to the bearing support having a smaller thermal expansion coefficient than the bearing support but a greater thermal expansion coefficient than the other bush.

23. An installation according to claim 22, characterized in that the bearing bush means have conical sealing surfaces and that one collar each is provided at both ends of the blade shaft having corresponding conical surfaces so that two conical seats are formed.

24. An installation according to claim 23, characterized in that an intermediate ring means is provided between the conical collars of the blade shaft and the conical surfaces of the bearing bush means, the intermediate ring means having the form of a truncated cone with its surfaces substantially parallel to the sealing surfaces.

25. An installation according to claim 23, characterized in that bush means includes two bushes fitted in a bore of the bearing support such that an annular space is left in the center portion of the bore extending in the axial direction between the two bushes, and in that a line supplying compressed air leads to said annular space.

26. An installation according to claim 1, characterized in that the respective dimension and thermal coeffieicnes of expansion are such that said first and second predetermined temperature ranges include portions covering different temperatures from one another, said first temperature range including temperatures lower than the lowest temperature of said second temperature range whereby at low temperatures sliding motion between the shaft and the bush means is permitted while sliding motion between the bush means and the support means is prevented.

27. An installation according to claim 26, characterized in that said second temperature range includes temperatures higher than the highest temperature of said first temperature range whereby at high temperatures sliding motion between the bush means and the support means is permitted while sliding motion between the bush means and the shaft is prevented.

28. An arrangement according to claim 1, characterized in that the bush means includes conical sealing surfaces for sealingly engaging conical surfaces provided on said shaft.

29. An arrangement according to claim 1, characterized in that the bush means includes two bushes fitted in a bore of the baring support such that an annular space is left in the center portion of the bore extending in the axial direction between the two bushes, and in that a line supplying compressed air leads to said annular space.

* * * * *